Figure 1:
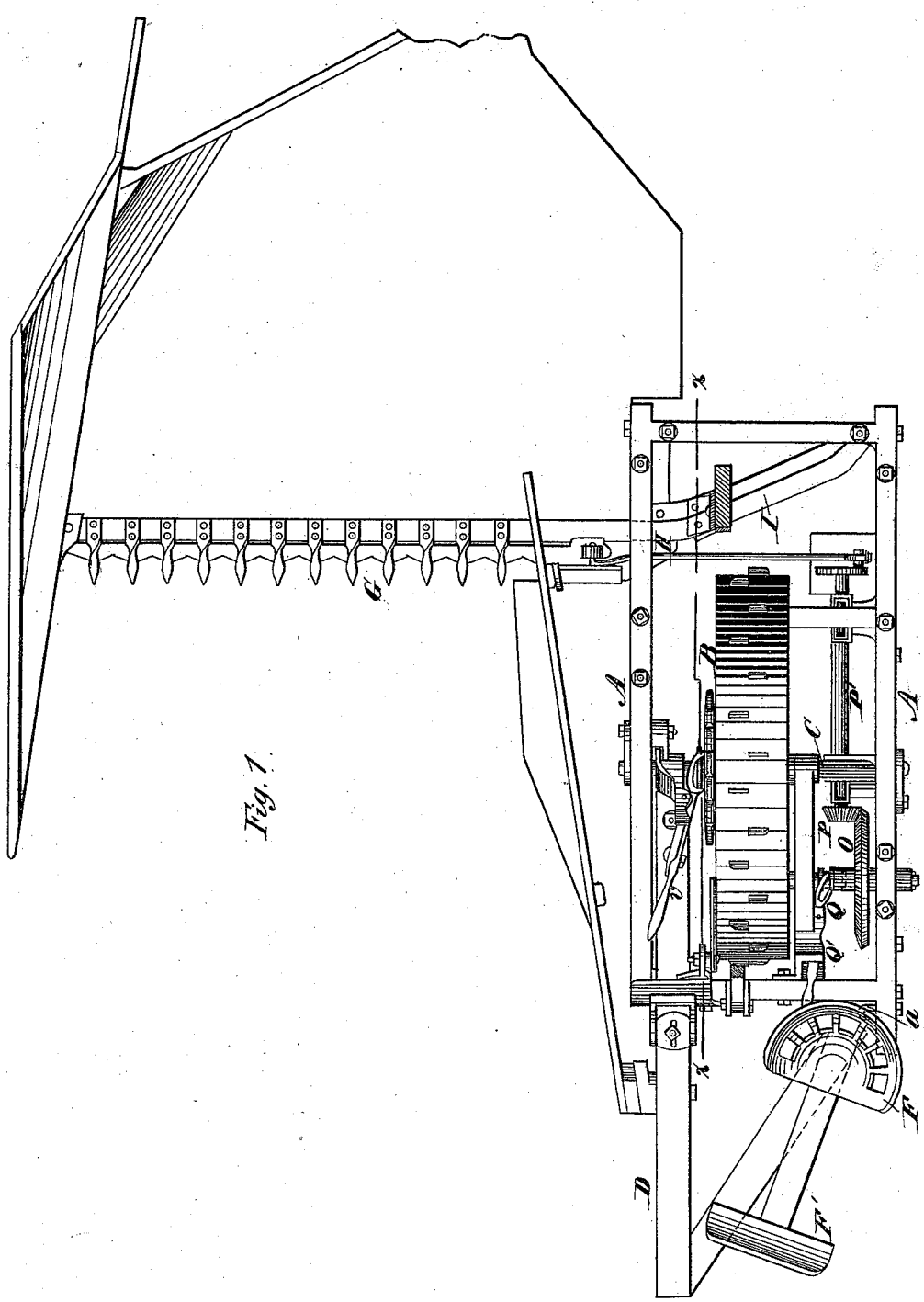

6 Sheets—Sheet 1.

L. J. McCORMICK, W. R. BAKER & L. ERPELDING.
HARVESTER.

No. 173,485. Patented Feb. 15, 1876.

WITNESSES
Wm. A. Wansleben
Wm J. Hyton

INVENTORS
L. J. McCormick, Wm. R. Baker and L. Erpelding
By Wm. D. Baldwin Their Attorney L. J. McCORMICK, W. R. BAKER & L. ERPELDING.
HARVESTER.
No. 173,485.
6 Sheets—Sheet 2.
Patented Feb. 15, 1876.
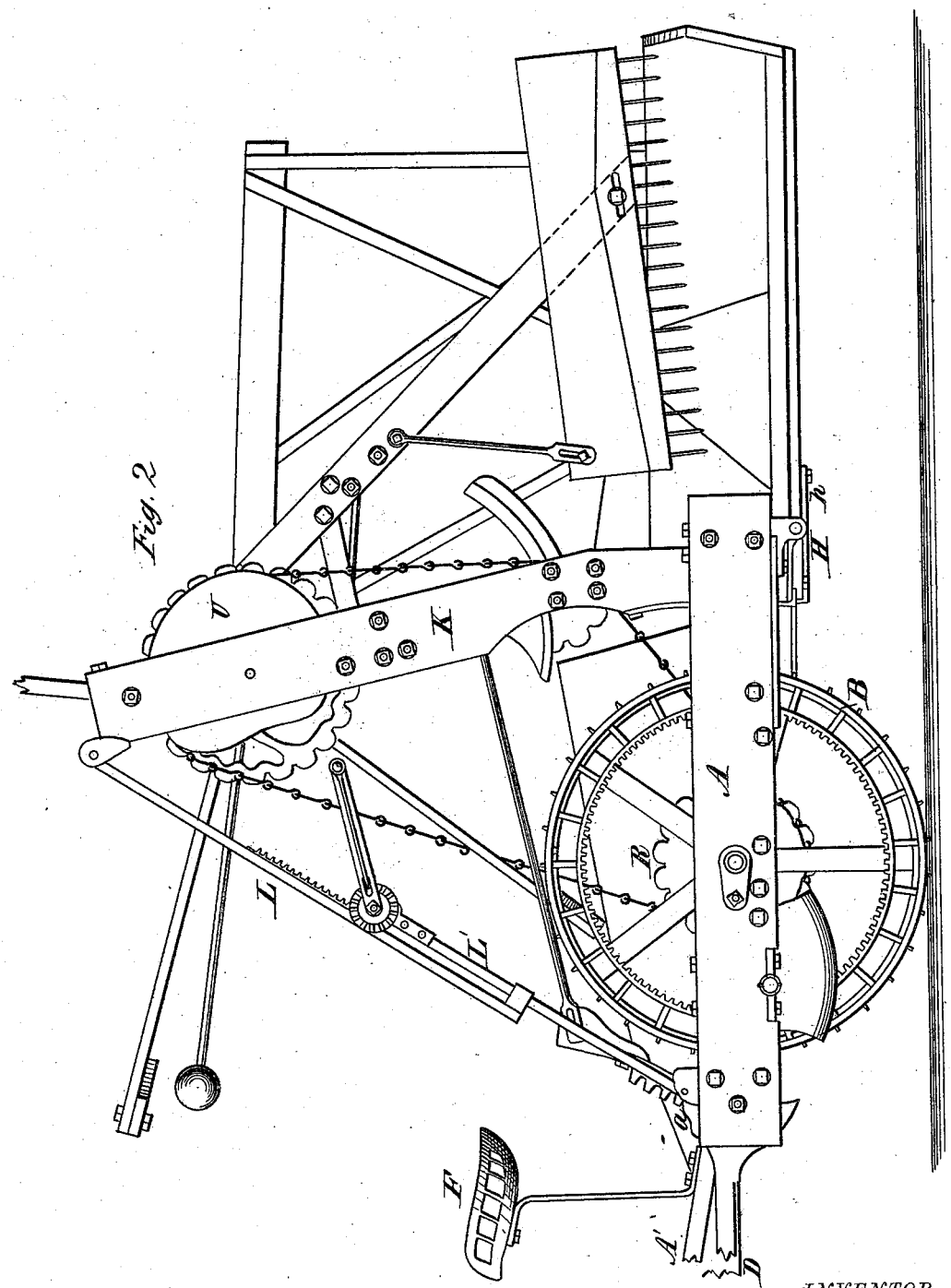

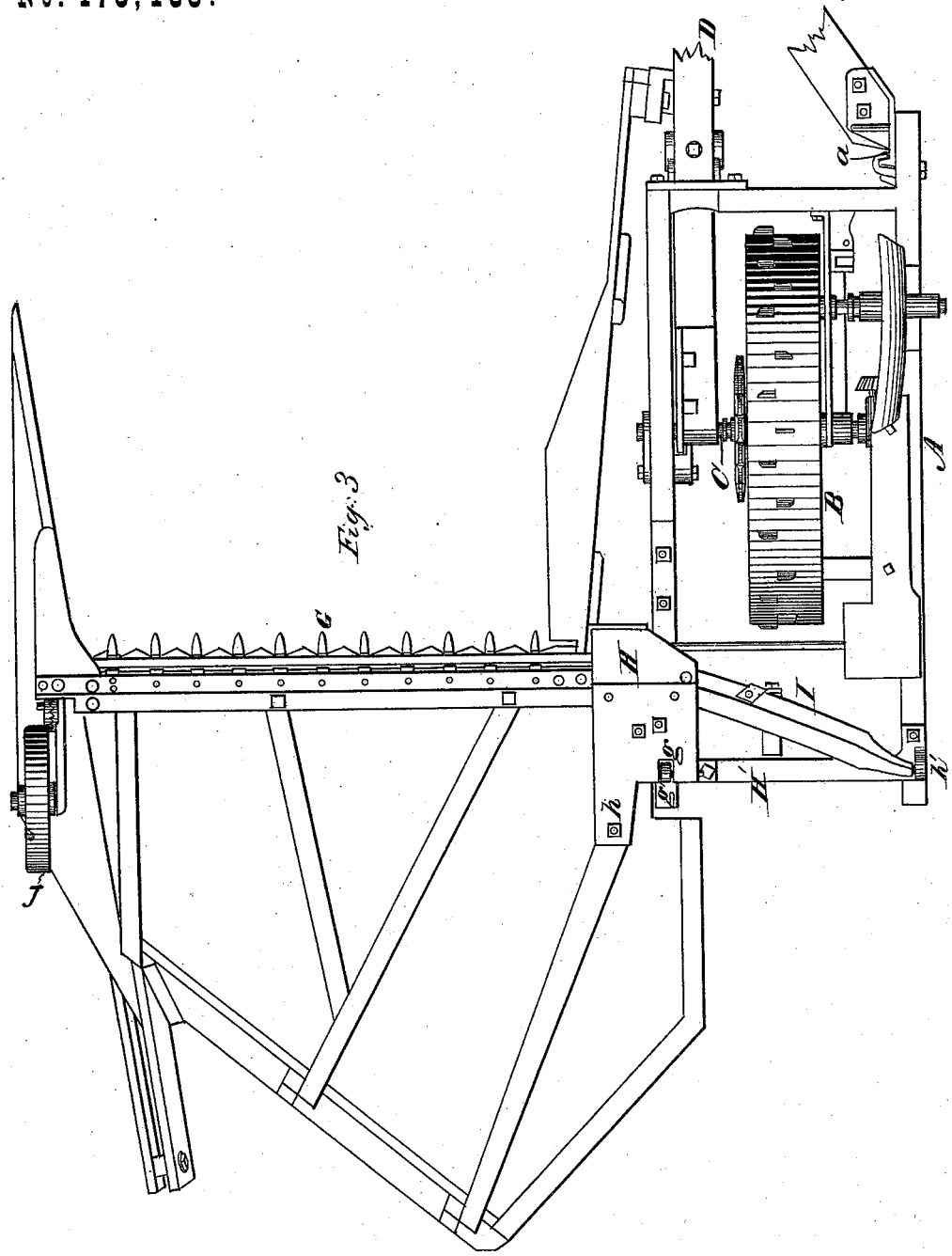

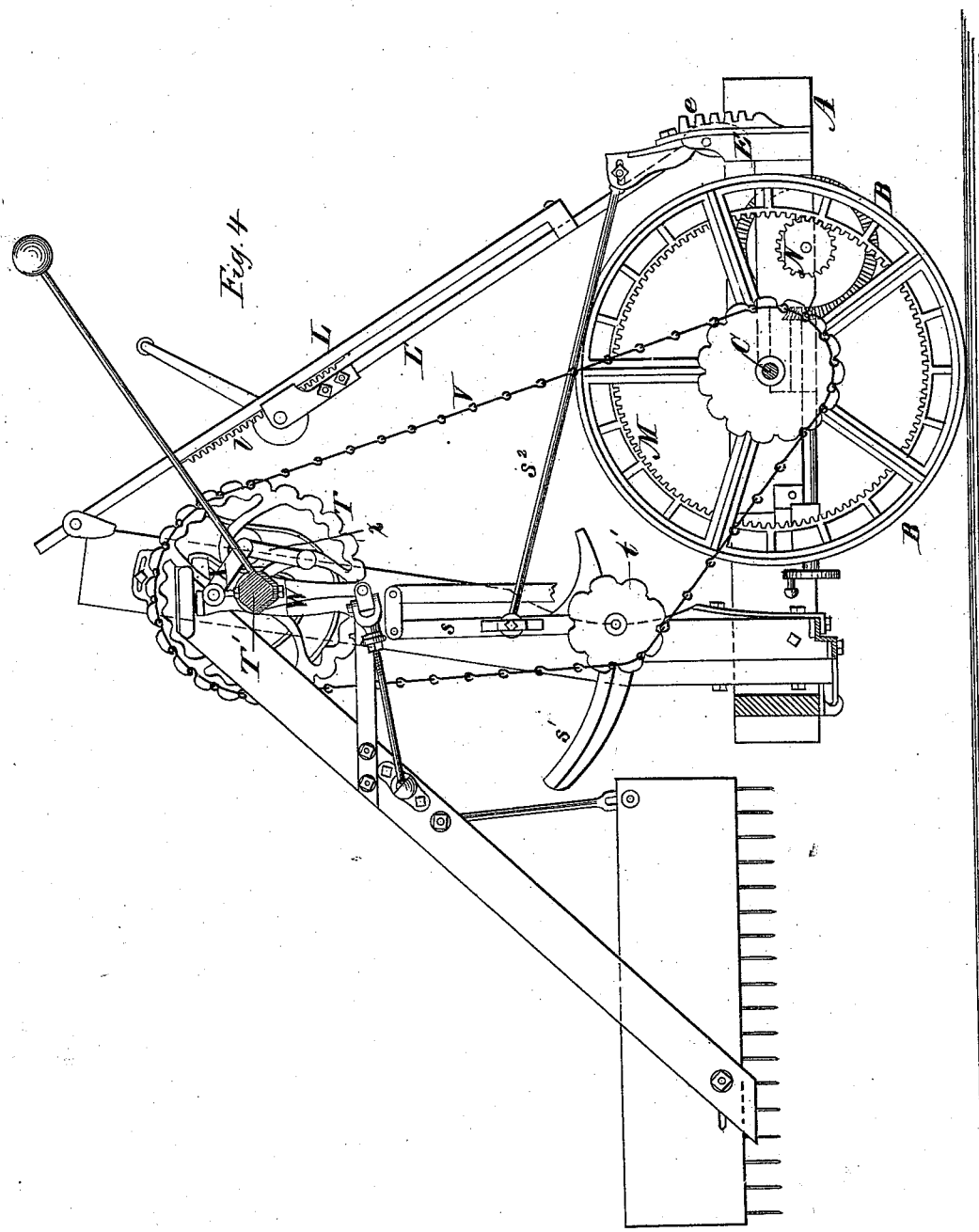

L. J. McCORMICK, W. R. BAKER & L. ERPELDING.
HARVESTER.
No. 173,485.
6 Sheets—Sheet 5.
Patented Feb. 15, 1876.
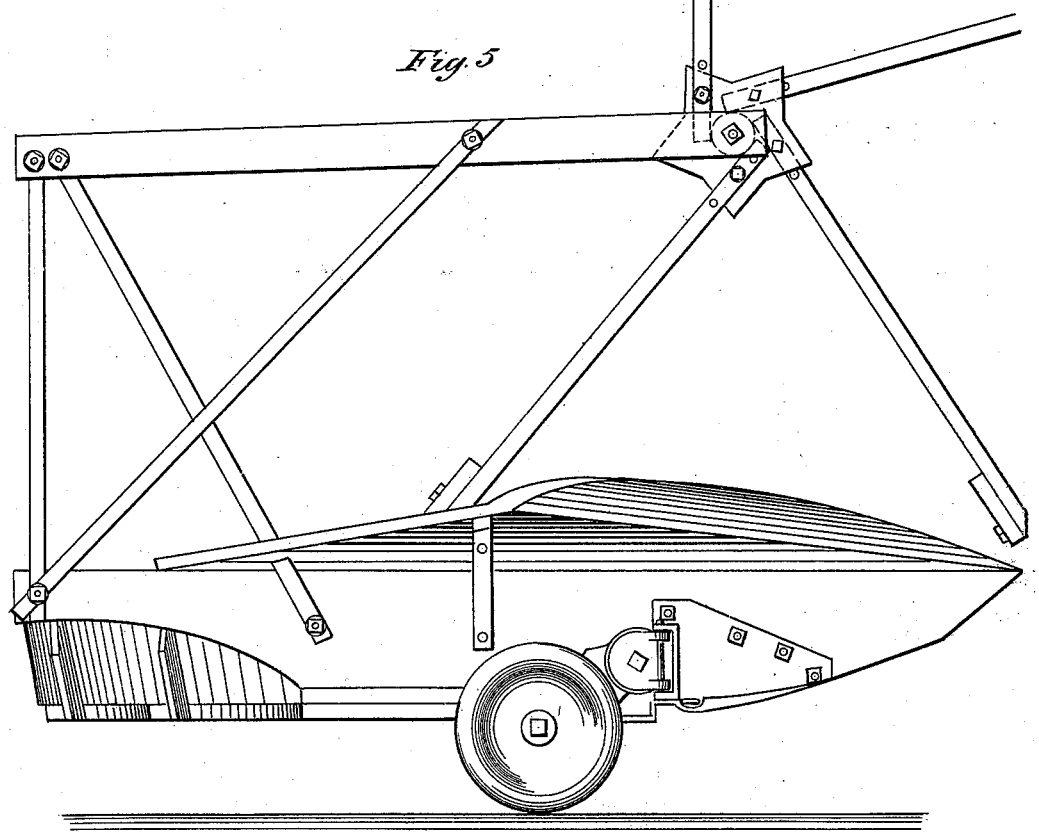

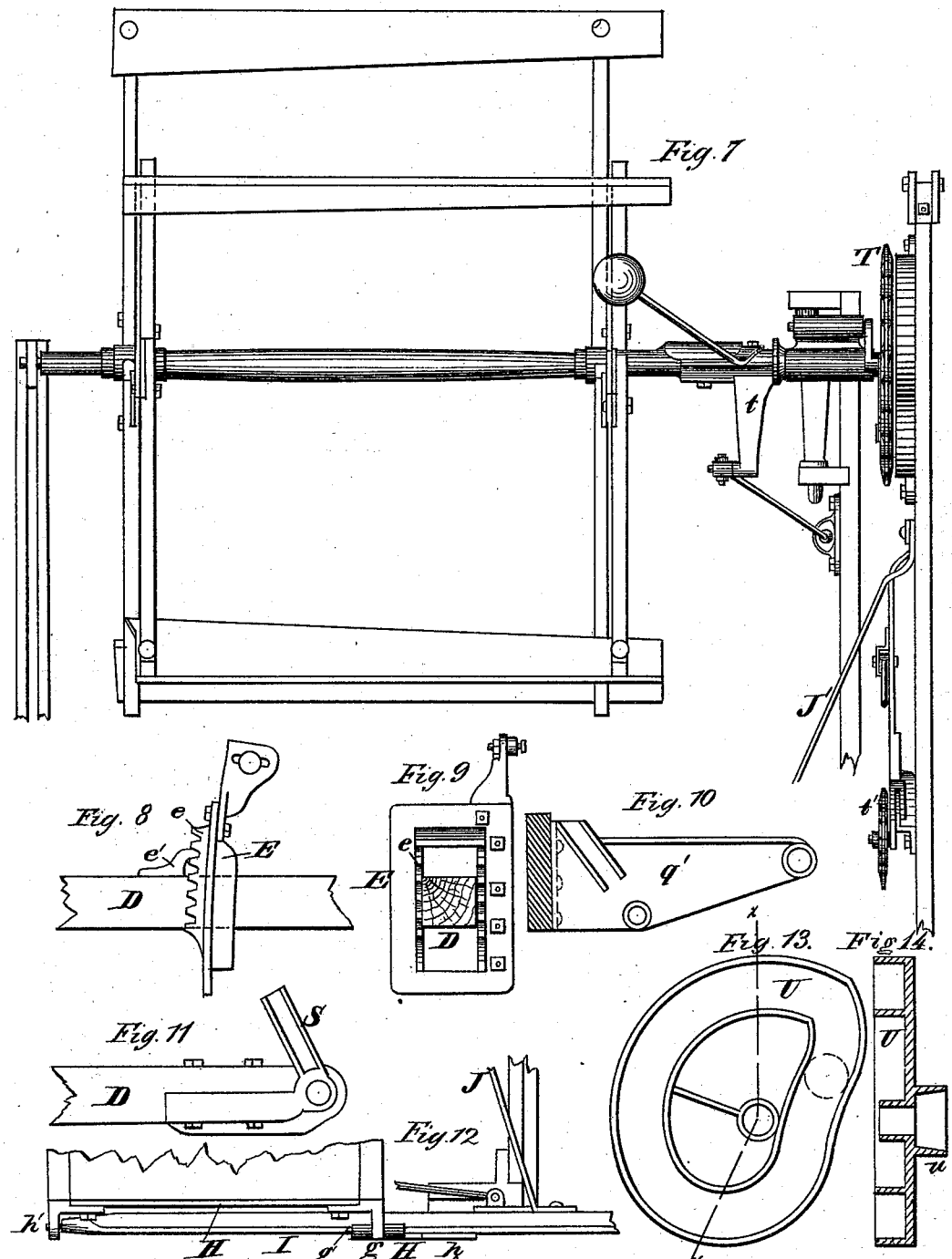

UNITED STATES PATENT OFFICE.

LEANDER J. McCORMICK, WILLIAM R. BAKER, AND LAMBERT ERPELDING, OF CHICAGO, ILLINOIS, ASSIGNORS TO C. H. AND L. J. McCORMICK, OF SAME PLACE.

IMPROVEMENT IN HARVESTERS.

Specification forming part of Letters Patent No. 173,485, dated February 15, 1876; application filed July 17, 1875.

*To all whom it may concern:*

Be it known that we, LEANDER J. McCORMICK, WILLIAM R. BAKER, and LAMBERT ERPELDING, all of Chicago, in the county of Cook and State of Illinois, have invented certain new and useful Improvements in Reaping-Machines, of which the following is a specification.

Our invention constitutes an improvement on the well-known McCormick reaper, and its object is to give a wide range of adjustment to the rake and cutting apparatus to adapt it to varying conditions of the crop.

The subject-matter claimed will hereinafter specifically be designated.

In the accompanying drawings, all our improvements are shown as embodied in one machine in the best way now known to us.

Figure 1 is a plan or top view with the rake and reel omitted; Fig. 2, a view in elevation from the gearing side of the machine; Fig. 3, a bottom plan view; Fig. 4, a vertical section on the line $x\ x$, of Fig. 1, showing the rake-arm and its operating mechanism in the position it assumes at the finish of the raking operation; Fig. 5, a view of the reel, divider, &c., from the grain side of the machine; Fig. 6, a plan or top view of the caster-wheel; Fig. 7, a front view of the reel and rake mechanism. Figs. 8, 9, 10, 11, 12, 13, and 14 are detached views of different parts of the mechanism and gearing.

The main frame A is supported by a driving-wheel, B, mounted on an axle, C, which axle also serves as a brace to strengthen the main frame. A tongue, D, is pivoted to this axle, and passes through a slotted yoke, E, situated on the inner front corner of the frame, in which yoke it can be vertically adjusted and held by means of a rack, e, and detent, e', working therein, or the tongue may be adjusted in any other well-known equivalent way. As the main frame rocks on its axle this adjustment of the tongue serves to regulate the height of the rear end of the frame from the ground.

A seat, F, and foot-board F' for the driver are mounted on a diagonal brace, A', projecting from the outer front corner of the main frame, its inner or rear end being supported thereon by an adjustable bracket, a, and its outer end rigidly secured to the tongue D.

It will be observed by this arrangement that the driver is located much farther forward than has heretofore been the custom, whereby the cutting and raking apparatus is counterbalanced, and the driver enabled to see well in advance of the cutters while located in a position out of danger of being struck by the rake.

A long finger-beam, G, is secured to the forward part of a shoe, H, having a butt-slide, h, projecting backwardly from it, and being also provided with lugs or bearings g at the back, through which and a socket, h', of a bracket-frame H', located on the rear under side of the main frame, passes a bolt, g', to hinge them together. This bracket-frame prevents twisting of the main frame, and forms a firm support for the finger-beam and shoe hinged thereto.

The finger-beam, or an extension, I, thereof, extends across the shoe to the stubble side of the main frame, its end being rounded and fitting so as to turn in a socket, h', on the outer corner of the bracket-frame H' before mentioned. The finger-beam proper lies at right-angles to the main-frame, but the extension I thereof is bent backward at a slight angle, as shown, thus bringing its hinged end in line with the hinges of the shoe, and nearly or quite in line with the axis of a caster-wheel, J, which supports the outer end of the cutting apparatus and platform. It will thus be seen that the finger-beam G is strongly braced against lateral strains while free to be rocked in its bearings to vary the inclination of the guard-fingers and rake-support.

A rake-post, K, is mounted on the extension of the finger-beam inside the frame and between the two hinges, and in the same vertical plane or thereabout as the face of the driving-wheel, which its upper end partly overhangs. This rake-post is securely braced against lateral strains, while leaving the finger-beam free to rock axially by a brace, J', one end of which is secured to the post and the other to the finger-beam outside the main frame. The cutting apparatus and rake are rocked to raise or lower the guard-fingers by means of a sectional brace, L L', and rack and pinion l, or by any other well-known equivalent means.

A spur-wheel, M, upon the inside of the drive-wheel, drives a corrresponding pinion, N, on a counter-shaft, N', located in front of the axle, and parallel therewith. A bevel-gear, O, on the counter-shaft, drives a corresponding pinion, P, on a crank-shaft, P', lying parallel or nearly so with the drive-wheel, which crank-shaft drives the cutters by means of a crank and pitman, as usual.

The cutting apparatus is thrown into or out of gear by a shipper, Q, pivoted in a bracket, Q', through journals or sockets of which both the main axle and counter-shaft pass, the shipper acting upon suitable clutch mechanism on the counter-shaft. Suitable protecting-plates are located on the under side of the main frame, to prevent injury to the gearing.

The reel and rake, which is of the well-known McClintock Young type, is driven by means of a sprocket-wheel, R, provided with clutch mechanism and mounted on the axle of the drive-wheel, it being thrown into or out of gear therewith by a shipper, $v$, mounted in an elbow-bracket, S, bolted to the rear end of the tongue D, and by which the tongue is hinged to the axle, the extent of movement of the bracket on the axle being limited by a stop secured to the frame. A chain, V, passing around this sprocket-wheel, drives a corresponding wheel, T, rigidly mounted or keyed on a shaft, T', turning in bearings in a cam, U, mounted upon the reel and rake post, this shaft at its outer end being provided with flanges, to which one end of the reel-shaft is secured, and is also provided with an arm, $t$, on one side, that drives the rake, it being connected with the rake-arm by a rod with universal joint and ball-and-socket connections. The rake-arm vibrates on trunnions on an arm, W, mounted on this shaft, one arm of a crank, X, rocking in bearings in this arm W, and the other traversing the cam-guide U, being supported therein by a pivoted link, $x$, on the sprocket-wheel, T. This cam-guide is adjustable, and is provided on the rear side, concentric to the box in which the shaft T works, with a circular flange or hub, $u$, the object of which is to form a bearing to hold the cam in a true position on the rake-post with respect to the other parts while it is being adjusted to vary the path traversed by the rake.

The requisite tension is preserved upon the chain V, when the cutting apparatus and rake are rocked to either raise or lower the guard-fingers, by passing it over a sprocket-wheel, $t'$, which has its bearings on the end of a pivoted arm, $s$, sliding upon and being guided in its movement by a curved bar, $s^1$, rigidly secured to the rake-post, a pitman, $s^2$, connecting the depending arm $s$, in this instance, with an extension of the slotted yoke.

We are aware that finger-beams have heretofore been pivoted to rock axially on their hinges, and do not broadly claim such rocking; but our new organization of these old parts enables us to impart a wide range of adjustment to the cutting apparatus, while securely bracing it against lateral strains.

We claim as our invention—

1. The combination, substantially as hereinbefore set forth, of the main frame, the shoe hinged thereto, the finger-beam secured to the shoe, and the extension of the finger-beam bent backward and pivoted to the main frame in the line of the hinge of the shoe, for the purposes specified.

2. The combination of the main frame, the shoe hinged at its back end thereto, the long finger-beam secured to the forward end of the shoe, having its extension bent backward and pivoted to the main frame in the line of the hinge of the shoe, and the caster-wheel having its axis substantially in the axial line of the hinges; these members being constructed and operating in combination, substantially as hereinbefore set forth, whereby a wide range of adjustment is imparted to the cutting apparatus and its parallelism with the ground maintained.

3. The combination of the driving-wheel, the main-frame rocking on the axle thereof, the shoe hinged at its back end to said frame, the long finger-beam secured to the forward end of the shoe having its extension bent backward and pivoted to the main frame in the line of the hinges of the shoe, and the rake-post mounted directly upon the extension of the finger-beam at a point in the rear of the line of the cutters; these members being constructed and operating in combination, substantially as hereinbefore set forth.

4. The combination of the main frame, the shoe hinged at its back end thereto, the long finger-beam secured to the forward end of the shoe having its extension bent backward and pivoted to the main frame in the line of the hinge of the shoe, the rake-post mounted directly upon the extension of the finger-beam inside the frame, at a point in rear of the line of the cutters, and the brace extending from the rake-post to the finger-beam outside the main frame and shoe.

5. The combination of the main frame rocking on the drive-wheel axle, the detent-yoke, the adjustable tongue hinged to the axle and passing through the yoke, the brace attached to the tongue and sliding against the outer front corner of the main frame, and the driver's seat, mounted on said brace, these members being constructed and operating in combination, substantially as hereinbefore set forth.

In testimony whereof we have hereunto subscribed our names.

LEANDER J. McCORMICK.
WM. R. BAKER.
LAMBERT ERPELDING.

Witnesses:
R. NEWTON,
D. McINTYRE.